United States Patent
Meshi et al.

(10) Patent No.: US 10,574,681 B2
(45) Date of Patent: Feb. 25, 2020

(54) DETECTION OF KNOWN AND UNKNOWN MALICIOUS DOMAINS

(71) Applicant: Palo Alto Networks (Israel Analytics) Ltd, Tel Aviv (IL)

(72) Inventors: Yinnon Meshi, Kibbutz Revivim (IL); Jonathan Allon, Haifa (IL); Eyal Firstenberg, Ramat HaSharon (IL); Yaron Neuman, Zoran (IL); Dekel Paz, Ramat Gan (IL); Idan Amit, Ramat Gan (IL)

(73) Assignee: PALO ALTO NETWORKS (ISRAEL ANALYTICS) LTD., Tel Aviv (IL)

( * ) Notice: Subject to any disclaimer, the term of this patent is extended or adjusted under 35 U.S.C. 154(b) by 197 days.

(21) Appl. No.: 15/694,890

(22) Filed: Sep. 4, 2017

(65) Prior Publication Data

US 2018/0069883 A1    Mar. 8, 2018

Related U.S. Application Data

(60) Provisional application No. 62/383,434, filed on Sep. 4, 2016.

(51) Int. Cl.
*G06N 20/00* (2019.01)
*H04L 29/06* (2006.01)
(Continued)

(52) U.S. Cl.
CPC ......... *H04L 63/1425* (2013.01); *G06N 20/00* (2019.01); *G06F 21/552* (2013.01);
(Continued)

(58) Field of Classification Search
CPC ... G06N 20/00; H04L 63/1425; H04L 63/145; H04L 63/1416; H04L 63/1408;
(Continued)

(56) References Cited

U.S. PATENT DOCUMENTS 8,245,304 B1    8/2012    Chen et al.
8,555,388 B1 *  10/2013   Wang ................. H04L 63/1416
                                                       726/23
(Continued)

OTHER PUBLICATIONS

Predicting Malicious Domains by Xu et al. Palo Alto Networks, Inc., USA pp. 5, Sep. 2014.*
(Continued)

*Primary Examiner* — Jeffrey C Pwu
*Assistant Examiner* — Ali H. Cheema
(74) *Attorney, Agent, or Firm* — Kligler & Associates Patent Attorneys Ltd.

(57) ABSTRACT

A method, including collecting information on data transmitted at respective times between multiple endpoints and multiple Internet sites having respective domains, and acquiring, from one or more external or internal sources, maliciousness information for the domains. An access time profile is generated based on the times of the transmissions to the domains, and a popularity profile is generated based on the transmissions to the domains. A malicious domain profile is generated based on the acquired maliciousness information, and the collected information is modeled using the access time profile, the popularity profile and the malicious domain profile. Based on their respective modeled collected information, one or more of the domains is predicted to be suspicious, and an alert is generated for the one or more identified domains.

33 Claims, 7 Drawing Sheets

(51) Int. Cl.
  *G06F 21/55* (2013.01)
  *G06N 7/00* (2006.01)
(52) U.S. Cl.
  CPC .............. *G06N 7/005* (2013.01); *H04L 63/14* (2013.01); *H04L 63/145* (2013.01); *H04L 63/1441* (2013.01)
(58) Field of Classification Search
  CPC ......... H04L 63/14; G06F 21/00; G06F 21/55; G06F 21/56; G06F 21/552
  USPC ........... 726/22, 23, 24; 709/227; 706/12, 14; 713/176
  See application file for complete search history.

(56) References Cited

U.S. PATENT DOCUMENTS

| | | | | |
|---|---|---|---|---|
| 8,561,188 | B1* | 10/2013 | Wang | H04L 63/1425 713/176 |
| 8,677,487 | B2* | 3/2014 | Balupari | G06F 21/552 726/23 |
| 8,826,434 | B2* | 9/2014 | Merza | H04L 63/1441 726/23 |
| 8,966,625 | B1* | 2/2015 | Zuk | H04L 63/145 709/227 |
| 9,038,178 | B1 | 5/2015 | Lin et al. | |
| 9,147,071 | B2 | 9/2015 | Sallam | |
| 9,154,516 | B1* | 10/2015 | Vaystikh | H04L 63/1425 |
| 9,215,239 | B1* | 12/2015 | Wang | H04L 63/1408 |
| 9,342,691 | B2 | 5/2016 | Maestas | |
| 9,378,361 | B1* | 6/2016 | Yen | G06F 21/55 |
| 9,386,028 | B2 | 7/2016 | Altman | |
| 9,462,009 | B1* | 10/2016 | Kolman | H04L 63/1425 |
| 10,148,690 | B2 | 12/2018 | Shen et al. | |
| 2008/0256622 | A1 | 10/2008 | Neystadt et al. | |
| 2011/0283357 | A1* | 11/2011 | Pandrangi | H04L 63/1425 726/22 |
| 2012/0158626 | A1 | 6/2012 | Zhu et al. | |
| 2014/0007238 | A1 | 1/2014 | Magee et al. | |
| 2014/0165207 | A1 | 6/2014 | Engel et al. | |
| 2015/0172300 | A1* | 6/2015 | Cochenour | H04L 63/145 726/23 |
| 2015/0358344 | A1 | 12/2015 | Mumcuoglu et al. | |
| 2015/0373039 | A1* | 12/2015 | Wang | H04L 63/1425 726/23 |
| 2015/0373043 | A1* | 12/2015 | Wang | G06F 21/552 706/12 |
| 2016/0042287 | A1* | 2/2016 | Eldardiry | G06F 21/00 706/14 |
| 2016/0057165 | A1* | 2/2016 | Thakar | G06F 21/56 726/24 |
| 2016/0134651 | A1* | 5/2016 | Hu | H04L 63/1425 726/23 |
| 2016/0150004 | A1 | 5/2016 | Hentunen | |
| 2016/0156655 | A1* | 6/2016 | Lotem | H04L 63/145 726/23 |
| 2016/0234167 | A1 | 8/2016 | Engel et al. | |
| 2016/0352772 | A1 | 12/2016 | O'Connor | |
| 2017/0026398 | A1 | 1/2017 | Mumcuoglu et al. | |
| 2017/0041333 | A1 | 2/2017 | Mahjoub et al. | |
| 2017/0126718 | A1* | 5/2017 | Baradaran | H04L 63/1425 |
| 2018/0288073 | A1 | 10/2018 | Hopper | |
| 2019/0007440 | A1 | 1/2019 | Lavi et al. | |

OTHER PUBLICATIONS

Wei et al., "Identifying New Spam Domains by Hosting IPS: Improving Domain Blacklisting", Dept. of Computer and Information Sciences, University of Alabama at Birmingham, 8 pages, Jan. 2010.

Iana., "Autonomous System (AS) Numbers", 1 page, Jul. 29, 2016.

Gross et al., "FIRE: FInding Rogue nEtworks", Annual Conference on Computer Security Applications, 10 pages, Dec. 7-11, 2009.

Frosch., "Mining DNS-related Data for Suspicious Features", Ruhr Universitat Bochum, Master's Thesis, 88 pages, Dec. 23, 2011.

Bilge et at., "Disclosure: Detecting Botnet Command and Control Servers Through Large-Scale NetFlow Analysis", Annual Conference on Computer Security Applications, 10 pages, Dec. 3-7, 2012.

Blum., "Combining Labeled and Unlabeled Data with Co-Training", Carnegie Mellon University, Research Showcase @ CMU, Computer Science Department, 11 pages, Jul. 1998.

Felegyhazi et al., "On the Potential of Proactive Domain Blacklisting", LEET'10 Proceedings of the 3rd USENIX Conference on Large-scale exploits and emergent threats, 8 pages, San Jose, USA, Apr. 27, 2010.

Konte et al., "ASwatch: An AS Reputation System to Expose Bulletproof Hosting ASes", SIGCOMM , pp. 625-638, Aug. 17-21, 2015.

Markowitz, N., "Bullet Proof Hosting: A Theoretical Model", Security Week, 5 pages, Jun. 29, 2010, downloaded from http://www.infosecisland.com/blogview/4487-Bullet-Proof-Hosting-A-Theoretical-Model.html.

Markowitz, N., "Patterns of Use and Abuse with IP Addresses", Security Week, 4 pages, Jul. 10, 2010, downloaded from http://infosecisland.com/blogview/5068-Patterns-of-Use-and-Abuse-with-IP-Addresses.html.

Goncharov,M., "Criminal Hideouts for Lease: Bulletproof Hosting Services", Forward-Looking Threat Research (FTR) Team, A TrendLabsSM Research Paper, 28 pages, Jul. 3, 2015.

Bilge at al., "Exposure: Finding Malicious Domains Using Passive DNS Analysis", NDSS Symposium, 17 pages, Feb. 6-9, 2011.

Firstenberg et al., U.S. Appl. No. 15/694,892, filed Sep. 4, 2017.

* cited by examiner

DETECTION OF KNOWN AND UNKNOWN MALICIOUS DOMAINS

CROSS-REFERENCE TO RELATED APPLICATIONS

This application claims the benefit of U.S. Provisional Patent Application 62/383,434, filed Sep. 4, 2016, which is incorporated herein by reference. This application is also related to U.S. Patent Application titled "Identifying Bulletproof Autonomous Systems" filed on even date with the present application, which is also incorporated herein by reference.

FIELD OF THE INVENTION

The present invention relates generally to computer systems and networks, and particularly to apparatus, method and software for detecting external malicious domains accessed by computers on a network.

BACKGROUND OF THE INVENTION

In many computer and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to prevent malware from spreading through the network.

In this latter category, for example, U.S. Patent Application 2014/0165207 to Engel et al. describes a method and system for detecting anomalous action within a computer network. The method starts with collecting raw data from at least one probe sensor that is associated with at least one router, switch or server in the computer network. The raw data is parsed and analyzed to create meta-data from the raw data, and computer network actions are identified based on knowledge of network protocols. The meta-data or a higher level aggregation is associated with entities by analyzing and correlating between the identified network actions. A statistical model of the computer network is created, for detection of anomalous network actions associated with the entities.

As another example, U.S. Patent Application 2015/0358344 to Mumcuoglu et al. describes a method for computer system forensics that includes receiving an identification of at least one host computer that has exhibited an anomalous behavior, in a computer network comprising multiple host computers. Respective images of the host computers in the network are assembled using image information collected with regard to the host computers. A comparison is made between at least one positive image of the at least one host computer, assembled using the image information collected following occurrence of the anomalous behavior, and one or more negative images assembled using the image information collected with respect to one or more of the host computers not exhibiting the anomalous behavior. Based on the comparison, a forensic indicator of the anomalous behavior is extracted from the positive and negative images.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method, including collecting, by a processor, information on data transmitted at respective times between multiple endpoints and multiple Internet sites having respective domains, acquiring, from one or more external or internal sources, maliciousness information for the domains, generating an access time profile based on the times of the transmissions to the domains, generating a popularity profile based on the transmissions to the domains, generating a malicious domain profile based on the acquired maliciousness information, modeling, using the access time profile, the popularity profile and the malicious domain profile, the collected information, predicting one or more of the domains to be suspicious based on their respective modeled collected information, and generating an alert for the one or more identified domains.

In some embodiments, predicting a given domain to be suspicious may include calculating a score responsive to the modeled data traffic for the given domain and the maliciousness information for the given domain, and detecting that the score is greater than a specified score threshold. In one embodiment, collecting the information may include retrieving data packets from the network. In an alternative embodiment, collecting the information may include retrieving the information from log data.

In additional embodiments, modeling the data traffic may include modeling, using a malicious artifact profile, the data traffic. In further embodiments, the malicious artifact profile may include one or more features selected from a group consisting of a domain reputation, a total number of connections to a given domain during a specific time period, an average volume of the connections to the given domain during a specific time period, a variance of the volume to the given domain during the a specific time period, and a number of referrers to the given domain.

In supplemental embodiments predicting a given domain to be suspicious may include predicting, for the given domain, a command and control (CnC) suspiciousness based on the modeled data traffic and a malicious suspiciousness based on the maliciousness information. In some embodiments, predicting the CnC suspiciousness may include executing a classification algorithm using a CnC suspiciousness model, and wherein predicting the malicious suspiciousness comprises executing the classification algorithm using a malicious domain model.

In additional embodiments, predicting the one or more domains to be suspicious may include predicting a plurality of domains to be CnC channels based on their respective CnC suspiciousness, and predicting, from the plurality of domains predicted to be CnC channels, the one or more domains based on their respective malicious suspiciousness. In further embodiments, predicting the one or more domains to be suspicious may include predicting a plurality of domains to be malicious based on their respective malicious suspiciousness, and predicting, from the plurality of domains predicted malicious, the one or more domains based on their respective CnC suspiciousness.

In supplemental embodiments, the access time profile may include one or more features selected from a group consisting of a number of distinct dates that a given endpoint accesses by a given domain, a number of distinct hours during a specific time period that that a given endpoint accesses by a given domain, a duration of a given transmission to a given domain, a variability of a session length for a given transmission to a given domain, an average volume of transmissions to a given domain, a number of distinct weekdays a given domain is accessed during a specific time period, a number of distinct weekend days a given domain is accessed during a specific time period, and a number of distinct hours a given domain is accessed during a specific time period, and wherein the popularity profile comprises one or more features selected from a group consisting of a number of distinct endpoints accessing a given domain during a specific time period, and a total number of connections to a given domain during a specific time period.

In some embodiments, a plurality of the endpoints may include respective additional processors executing multiple software processes transmitting to the domains, and the method may include identifying a first given software process as unpopular, identifying a second given software process as popular, identifying a first given domain as unpopular, and identifying a second given domain as anomalous, and wherein predicting one or more of the domains to be suspicious comprises identifying the first given software process transmitting to the first given domain or identifying the second given software process transmitting to the second given domain.

There is also provided, in accordance with an embodiment of the present invention, an apparatus, including a memory, and a processor configured to collect information on data transmitted at respective times between multiple endpoints and multiple Internet sites having respective domains, to acquire, from one or more external or internal sources, maliciousness information for the domains, to generate an access time profile based on the times of the transmissions to the domains, to generate a popularity profile based on the transmissions to the domains, to generate a malicious domain profile based on the acquired maliciousness information, to model, using the access time profile, the popularity profile and the malicious domain profile, the collected information, to predict one or more of the domains to be suspicious based on their respective modeled collected information, and to generate an alert for the one or more identified domains.

There is additionally provided, in accordance with an embodiment of the present invention, a computer software product, the product including a non-transitory computer-readable medium, in which program instructions are stored, which instructions, when read by a computer, cause the computer to collect information on data transmitted at respective times between multiple endpoints and multiple Internet sites having respective domains, to acquire, from one or more external or internal sources, maliciousness information for the domains, to generate an access time profile based on the times of the transmissions to the domains, to generate a popularity profile based on the transmissions to the domains, to generate a malicious domain profile based on the acquired maliciousness information, to model, using the access time profile, the popularity profile and the malicious domain profile, the collected information, to predict one or more of the domains to be suspicious based on their respective modeled collected information, and to generate an alert for the one or more identified domains.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
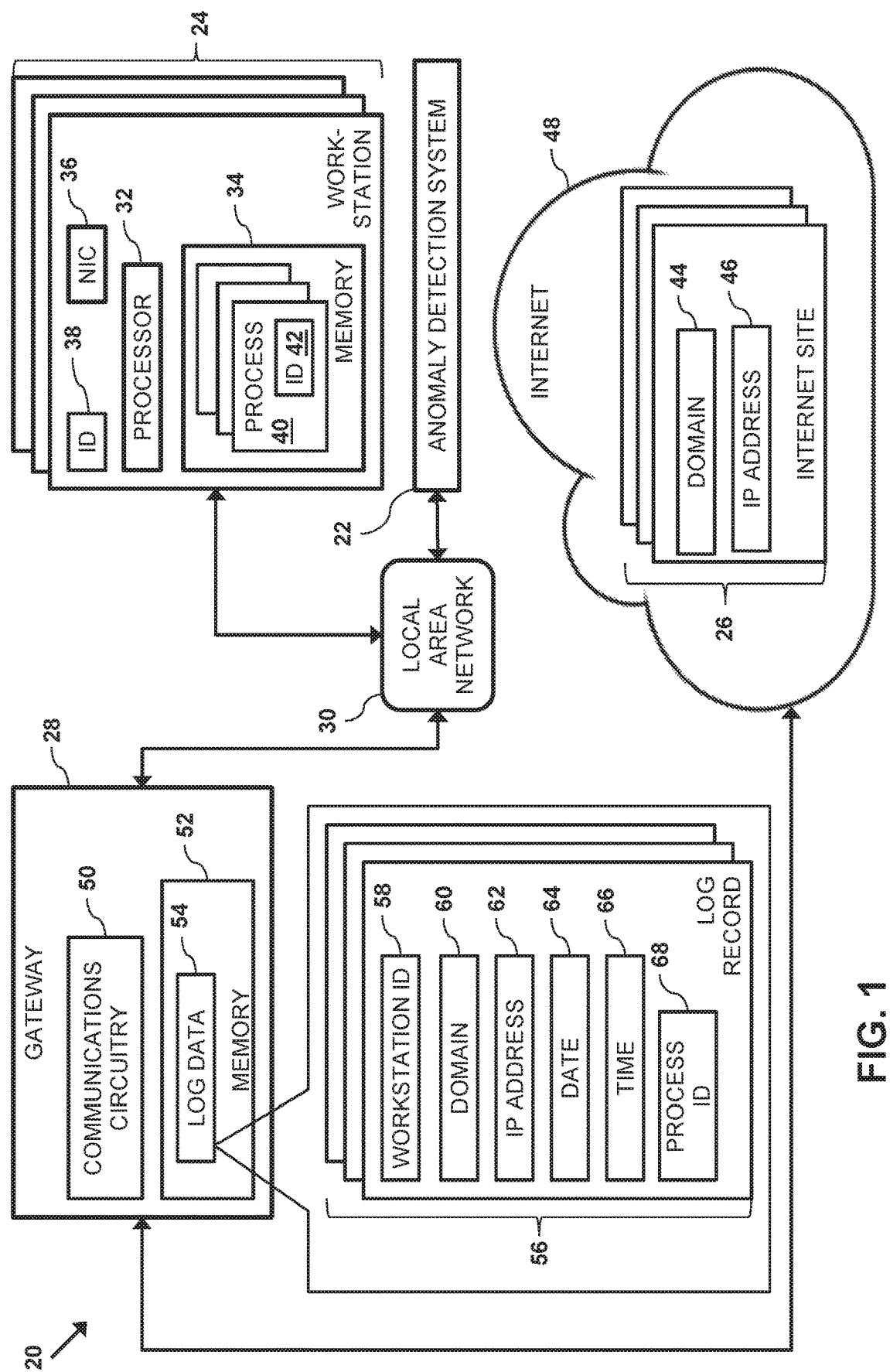
FIG. 1 is a block diagram that schematically shows a computing facility comprising an anomaly detection system configured to identify domains hosting malicious Command and Control (CnC) channels, in accordance with an embodiment of the present invention.

When attacking a computer or a group of computers in a network, an attacker typically requires a Command and Control (CnC) channel that the attacker uses to control malware(s). Contacting an affected computer from outside a corporate network is typically prevented. To overcome this limitation, an attacker can configure the malware to periodically contact the attacker from within the network, and upon being contacted, the attacker can respond (i.e., to the malware) with instructions or requests for additional data.

Categories of CnC channels include:

Broad and legitimate. Examples include WindowsUpdate™ (produced by Microsoft Corporation, Redmond Wash.), and updates for Antivirus programs, Broad and risky. Examples include botnets and browser plugins that request ads to be presented, by the browser, to a user, and to convey collected usage statistics of the use.

Rare and legit. Examples include rich site summary (RSS) updates from blogs.

Rare and malicious. These are typically advanced persistent threats (APTs), and typically do not include botnets.

Embodiments of the present invention provide methods and systems for detecting domains of malicious CnC channels that can be used to compromise data and/or executable code (e.g., inject malware that can cause damage) in a corporate network. These malicious CnC channels typically fall into the "rare and malicious" category described supra (i.e., specific domains used by APTs for CnC purposes).

As described hereinbelow, data transmitted between multiple endpoints (e.g., computer workstations) in a network and multiple Internet sites is collected, each of the Internet sites having respective domains. Using one or more acquired external and/or internal data sources, maliciousness information is identified for the domains in the collected data.

A malicious domain profile is generated based on the acquired maliciousness information, an access time profile is generated based on the times of the transmissions to the domains, and a popularity profile is generated based profile based on the transmissions to the domains. The access time and the popularity profiles are described in the description referencing FIG. 3 hereinbelow.

Using the generated malicious domain, access time and popularity profiles, the collected information can then be modeled. Based on their respective modeled collected information, one or more domains to be suspicious, and an alert can be generated for the one or more identified domains. In some embodiments, other types of analysis that can be performed and used to compute the score for include more complex computations, such as an estimation of a probability that a given domain is (a) being used as a CnC channel, and (b) being used for malicious behavior.

Embodiments described herein focus on communication between a malware and a domain. There can also be channels between malware and IP addresses, and some embodiments of the present invention are likewise applicable, mutatis mutandis, to detecting malicious IP addresses. Therefore, in some embodiments generating an alert for a given domain may comprise blocking access to the given domain or to any IP addresses belonging to the given domain.

System Description

FIG. 1 is a block diagram that schematically shows a computing facility 20 comprising an anomaly detection system 22 that monitors transmissions from multiple workstations 24 (also referred to as endpoints) to multiple Internet sites 26 in order to determine if any of the Internet sites are hosting malicious Command and Control (CnC) channels, in accordance with an embodiment of the present invention. Computing facility 20 also comprises an Internet gateway 28, which is coupled, along with workstations 24, to a network 30, such as a local area network.

Each workstation 24 comprises a workstation processor 32 and a workstation memory 34, which are connected by a bus (not shown) to a workstation network interface controller (NIC) 36 that couples the workstation to network 30 (i.e., the network monitored by anomaly detection system 22). Each workstation 24 also comprises a workstation ID 38 such as a MAC address that can be used to uniquely identify each of the workstations. In operation, processors 32 execute (software) processes 40 (e.g., "EXE" and "DLL" applications) from memories 34. Each process 40 has a corresponding workstation process ID 42 (e.g., a process name such as "WindowsUpdate").

Anomaly detection system 22 is described in the description referencing FIG. 2 hereinbelow. While the configuration in FIG. 1 shows anomaly detection system 22 and workstations 24 coupled to local area network 30, configurations where the anomaly detection system and the workstations are coupled to (and communicate over) any type of network (e.g., a wide area network or a data cloud) are considered to be within the spirit and scope of the present invention. In some embodiments, some or all of workstations 24 and anomaly detection system 22 may be deployed on network 30 as virtual machines.

Each Internet site 26 comprises a site domain 44 and a site IP address 46. In embodiments described herein the term domain may also refer to a domain name for a given domain. Gateway 28 couples computing facility 20 to public networks 48 such as the Internet, and comprises communications circuitry 50 and a gateway memory 52 that are connected by a gateway bus (not shown). Communications circuitry 50 typically comprises a gateway processor and network circuitry (both not shown) that enable communication between workstations 24 and Internet sites 26.

In some embodiments, memory 52 stores log data 54 comprising log records 56 that include details of communications between workstations 24 and Internet sites 26. In these embodiments, gateway 28 may comprise a clock module (not shown) that the gateway can use to determine dates and times of the respective communications.

In the configuration shown in FIG. 1, these communication details include a log workstation ID 58, a log domain 60, a log IP address 62, a log date 64, a log time 66 and a log process ID 68. For example, when a given workstation 24 having given workstation ID 38 accesses, on a given date at a given time, a given Internet site 26 having a given domain 44 and a given IP address 46, gateway 28 can add a new log record 56 to log data 54, and store, to the new log record, the given workstation ID to log workstation ID 58, the given domain to log domain 60, the given IP address to log IP address 62, the given date to log date 64, the given time to log time 66, and a given process ID (i.e., corresponding to the process that requested the access) to log process ID 68.

Figure 2:
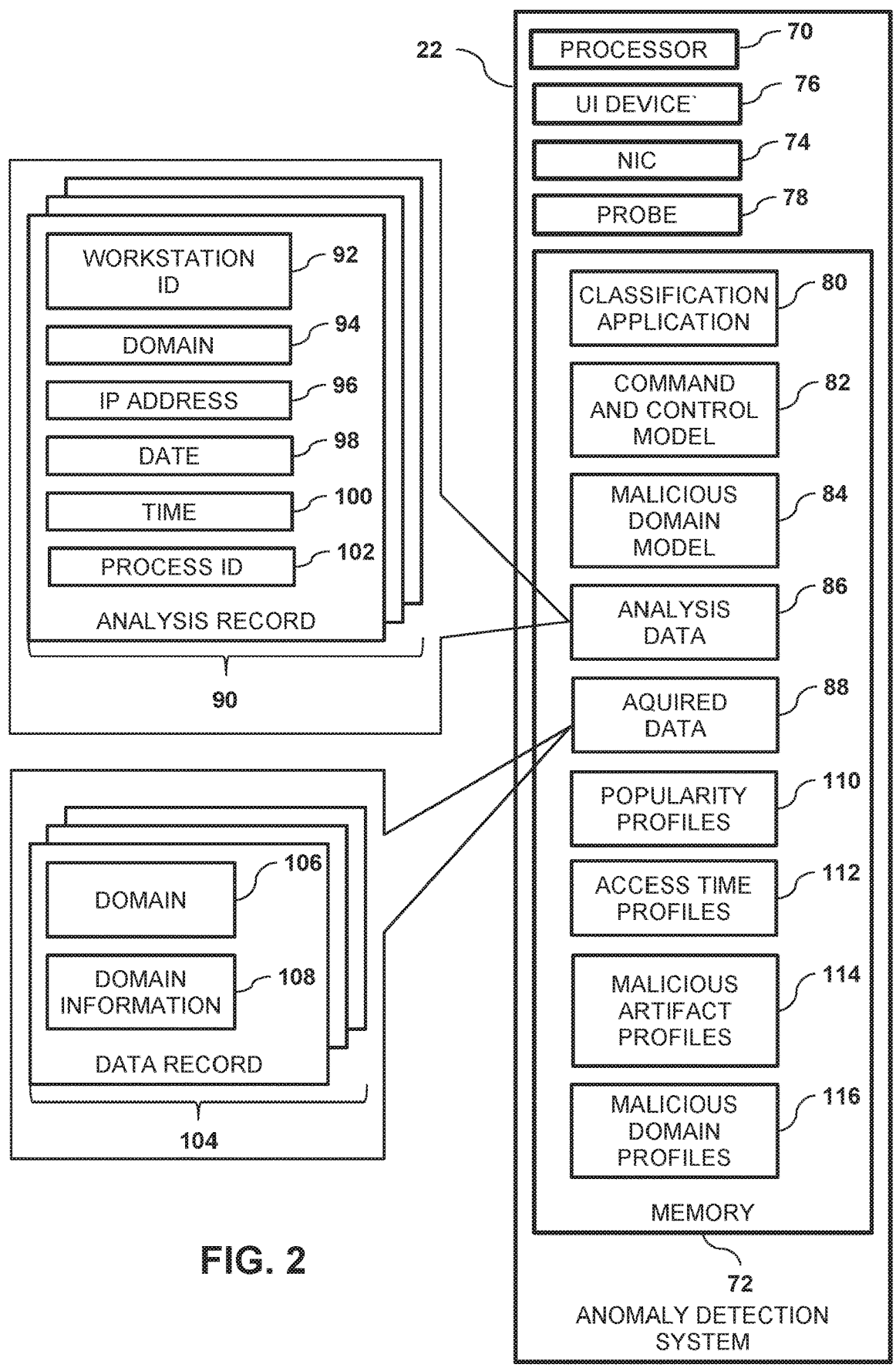
FIG. 2 is a block diagram of the anomaly detection system, in accordance with an embodiment of the present invention.

FIG. 2 is a block diagram of anomaly detection system 22, in accordance with an embodiment of the present invention. Anomaly detection system 22 comprises a system processor 70 and a system memory 72, which are connected by a system bus (not shown) to a system network interface controller (NIC) 74 that couples the anomaly detection system to network 30. In some embodiments, anomaly detection system 22 may comprise a user interface (UI) device 76 (e.g., a computer monitor) or another type of output interface. Examples of memories 34 and 72 include dynamic random-access memories and non-volatile random-access memories. In some embodiments, memories 34 and 72 may Include non-volatile storage devices such as hard disk drives and solid-state disk drives.

In the configuration shown in FIG. 2, anomaly detection system 22 comprises a probe 78 that collects information on data transmitted over network 30. While the example in FIG. 2 shows probe 78 as a module of anomaly detection system 22, the probe may be implemented as either a standalone device coupled to network 30 or as a module in another device coupled to the network. Using probe 78 to collect data packets from network 30 and processing the collected data packets to extract information is described, for example, in U.S. Patent Application 2014/0165207 to Engel et al. and U.S. Patent Application 2015/0358344 to Mumcuoglu et al., whose disclosures are incorporated herein by reference. In some embodiments, probe 78 may comprise a clock module (not shown) that the probe can use to determine dates and times of the collected data packets.

Memory 72 stores a malicious domain model 84, analysis data acquired data 88, and a classification application 80 comprising a classification algorithm to generate a CnC model 82 and a malicious domain model 84, analysis data 86 and acquired data 88. Classification application 80 and models 82 and 84 are described hereinbelow.

Analysis data 86 comprises analysis records 90 that store information on data transmitted from workstations 24 to Internet sites 26. In one embodiment, computing facility 20 stores analysis records 90 in a database. In embodiments where probe 78 collects real-time data packets transmitted over network 30, processor 70 can input the information collected from the data packet to models 82 and/or 84.

Each analysis record 90 comprises information such as an analysis workstation ID 92 (also referred to herein as a source 92), an analysis domain 94 (also referred to herein as a domain 94), an analysis IP address 96 (also referred to herein as an IP 96), an analysis date 98, an analysis time 100 and an analysis process ID 102. In some embodiments, processor 70 can collect the information on data transmitted over network 30 during a training period, and use the collected information (e.g., in records 90) to train models 82 and 84. Processor 70 can the collect the information on data transmitted over network 30 during a subsequent production period (e.g., via probe 78), and use embodiments described herein (e.g., applying models 82 and 84) to identify domains 44 that are suspected of hosting malicious CnC channels.

In one embodiment, processor 70 can collect information from network 30 by retrieving, for a specific time period (e.g., by selecting, based on respective log dates 64 and log times 66), a plurality of log records 56 from gateway 28, and storing, to a corresponding plurality of analysis records 90, log workstation IDs 58 to respective analysis workstation IDs 92, log domains 60 to respective analysis domains 94, log IP addresses 62 to respective analysis IP addresses 96, log dates 64 to analysis dates 98, log times 66 to analysis times 100, and log process IDs 68 to analysis process IDs 102. Other methods of collecting the information from network 30 are described Using probe 78 to collect data packets from network 30, for example, in U.S. Patent Application 2014/0165207 to Engel et al. and U.S. Patent Application 2015/0358344 to Mumcuoglu et al., cited supra.

In another embodiment, processor 70 can collect the information by using, during the specific time period, probe 78 to retrieve data packets from network 30 and extracting, from the data packets, data transmissions from workstations 24 to Internet sites 26. For each transmission collected by probe 78, processor 70 can add a new analysis record 90, and store, to the added analysis records, workstation IDs 38 to respective analysis workstation IDs 92, site domains 44 to respective analysis domains 94, site IP addresses 46 to respective analysis IP addresses 96, current dates to analysis dates 98, current times to analysis times 100, and process IDs 42 to analysis process IDs 102.

Acquired data 88 comprises data (typically acquired from one or more external sources, as described hereinbelow) that can be used to identify information about domains 94. Acquired data 88 comprises data records 104, each data record 104 comprising an acquired domain 106 and acquired domain information 108. As described hereinbelow, for a given data record 104 having a given domain 106, domain information 108 can include data such as (a) whether or not the given domain is a top level domain (this can be computed by processor 70), (b) a number of IP addresses associated with the given domain, (c) an age of the given domain, (d) whether or not a registrant name or registrant organization for the given domain is hidden, and (d) whether or not the given domain maps to an IP address belonging to a suspicious (e.g., bulletproof, as described hereinbelow) Autonomous System Number (ASN).

ASNs are respective collections of connected Internet Protocol (IP) addresses that are usually controlled by the same network operator. If the given domain belongs to an ASN, domain information 108 can include information such as (a) a number of ASNs associated with the given domain, (b) whether or not the ASN is rentable, and (c) whether or not the ASN is bulletproof. ASN data can be obtained, for example, from the Internet Assigned Numbers Authority (www.iana.org, Playa Vista, Calif.).

In some embodiments, memory 72 also stores one or more domain popularity profiles 110, one or more access time profiles 112, one or more malicious artifact profiles 114, and one or more malicious domain profiles 114. Profiles 110, 112, 114 and 116 are described in the description referencing FIG. 3 hereinbelow.

Although anomaly detection system 22 is shown and described here for the sake of simplicity as a single, stand-alone unit, in practice the functions of the anomaly detection system may be Integrated with other software-based functions in a single given workstation 24 and/or distributed over a group of workstations 24. In particular, anomaly detection system 22 may be Integrated in a given workstation 24 that also monitors and investigates other types of security threats in computing facility 20. Such a computer may also, for example, perform the anomaly detection functions described in the above-mentioned U.S. Patent Application 2014/0165207 and/or the forensic functions described in the above-mentioned U.S. Patent Application 2015/0358344. In some embodiments, anomaly detection system 22 may be deployed in computing facility 20 as one or more virtual machines.

Processors 32 and 70 comprise a general-purpose central processing unit (CPU) or special-purpose embedded processors, which are programmed in software or firmware to carry out the functions described herein. This software may be downloaded to the computer in electronic form, over a network, for example. Additionally or alternatively, the software may be stored on tangible, non-transitory computer-readable media, such as optical, magnetic, or electronic memory media. Further additionally or alternatively, at least some of the functions of processors 32 and 70 may be carried out by hard-wired or programmable digital logic circuits.

Malicious Command and Control Channel Identification

Figure 3:
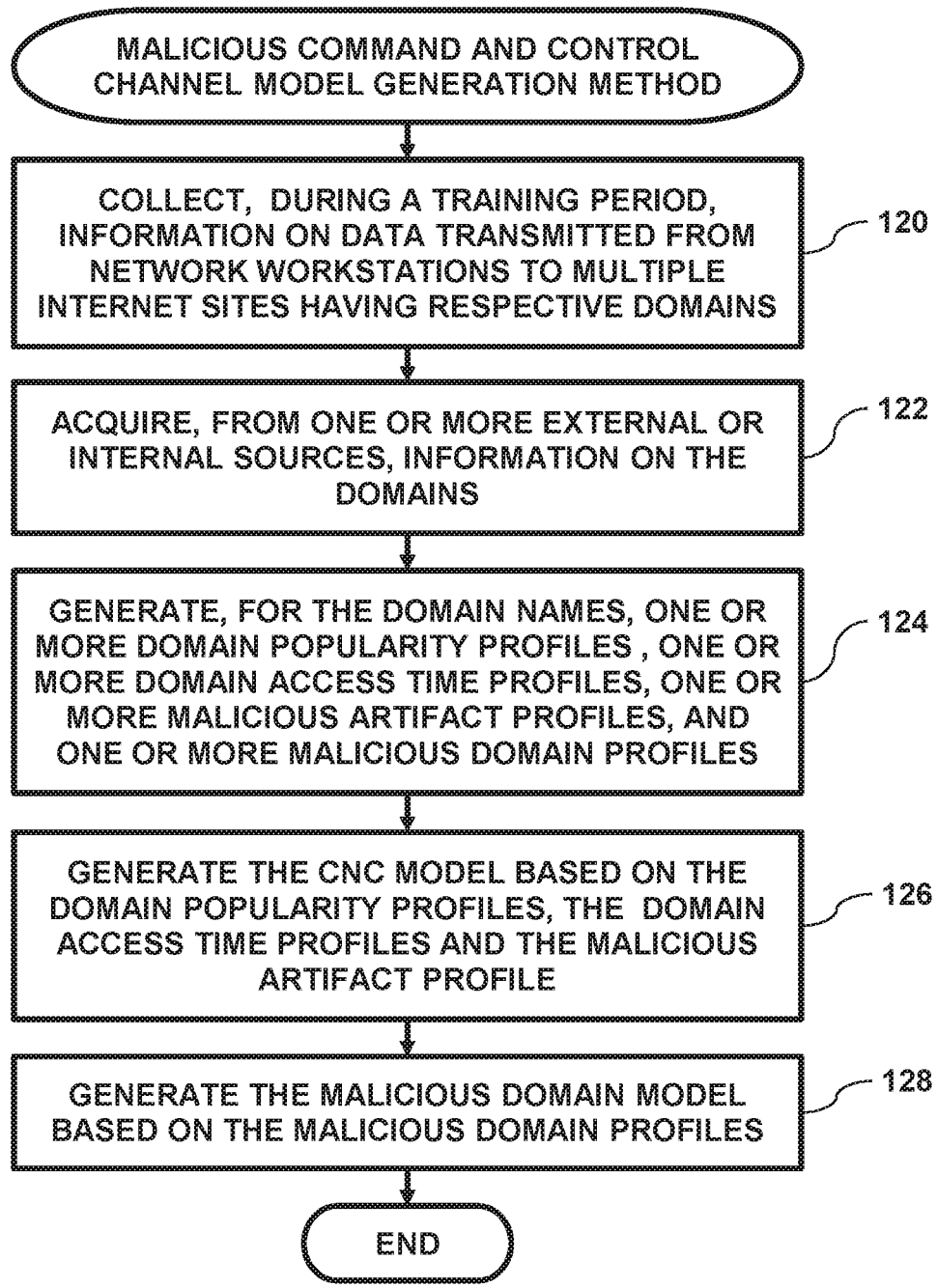
FIG. 3 is a flow diagram that schematically illustrates a method for generating a model to identify one or more domains that are suspected of hosting malicious CnC channels, in accordance with an embodiment of the present invention.

FIG. 3 is a flow diagram that schematically illustrates a method for generating model 82, in accordance with an embodiment of the present invention. In a collection step 120, processor collects, during a training period, information on data transmitted from workstations 24 to Internet sites 26, and stores the collected information to analysis records 90. Using embodiments described supra, processor 70 can collect the information from log data 54 or from data packets transmitted over network 30 (e.g., collect from probe 78 in real-time), and store the information to analysis records 90.

In an acquisition step 122, processor 70 acquires, for domains 94, respective domain information 108 from one or more external or internal sources. In embodiments described herein, one or more external or internal sources can be interpreted as one or more external and/or internal sources.

Examples of external sources include parsed or non-parsed WHOIS data, publicly available domain to IP information, and domain reputation information from vendors such as Virus Total (a division of Alphabet Inc., Dublin, Ireland). WHOIS data can be obtained using the WHOIS protocol specification (RFC 3912) that is a query and response protocol widely used for querying databases that store registered users or assignees of an Internet resource (e.g., such as a domain, an IP address block, or an autonomous system).

In embodiments of the present invention, processor 70 can use information from the external sources described hereinabove to define malicious domain profiles 116. Additional examples of the information from external or internal sources that processor 70 can acquire and use for profiles 116 include:

- Domain string (internal). The length of the domain's string is a direct correlation of its suspiciousness, as explained hereinbelow in Appendix 5. Additionally, domain top levels (e.g., ".com", ".edu" and ".xyz") can correlate directly to its suspiciousness.
- WHOIS (i.e., domain registration records). A person or organization that registered (i.e., purchased) a given domain 94 tried to hide their identity (e.g., via a 3rd party service) indicates a high suspicion that the given domain is malicious. Additionally domains 94 that are newer (i.e., age of registration) are more suspicious than domains 94 that are older.
- Autonomous system (also known as AS or ASN—an Internet provider that provides the IP address for the domain). An ASN is a company that owns a specific range of IP addresses 46, and some ASNs provide Internet services. A few of the ASNs that provide Internet services are considered to be "bulletproof". Bulletproof ASNs are "friendly" to malicious activity since they allow hosting almost everything on their servers and promise not to take it down and not to cooperate with law enforcement authorities. In embodiments of the present invention, domains belonging to bulletproof ASNs are considered to be highly suspicious. Detecting bulletproof ASNs is described in U.S. Patent Application titled "Identifying Bulletproof Autonomous Systems" filed on even date with the present application, which is incorporated herein by reference.

In a profile generation step 124, processor 70 generates one or more domain popularity profiles 110, one or more access time profiles 112, one or more malicious artifact profiles 114, and one or more malicious domain profiles 116. In embodiments of the present invention, the one or more domain popularity profiles can be used to help identify how popular the given domain is with workstations 24, the one or more access time profiles can be used to help identify patterns or features of the specific times that the given domains were accessed by the workstations, and the one or more malicious domain profiles can be used to help identify one or more domains 94 suspected of being malicious. Features used in the profiles are described, for example in Appendices 1 and 10 hereinbelow. In the table presented in Appendix 10, examples of features for the malicious domain profile are shown in the rows with "domain suspiciousness" in the detector column. Additional information used for the malicious domain profiles is described supra (e.g., domain string length, ASN and WHOIS information, domain to IP information, etc.)

The one or more malicious artifact profiles can be used to identify patterns or features of the specific transmissions to the given domain. Malicious artifact profiles 114 might include domain reputation information from domain reputation sources (i.e., data acquired from external sources). For example, a given domain 44 that is identified to communicate with malware(s) can be considered to be malicious. Information that can be used to define the malicious artifact profiles include:

- Total number of connections to a given domain 44 during a specific time period (e.g., 30 days).
- Average volume of all the connections to the given domain during a specific time period (e.g., daily or hourly).
- Variance of the volume of the connections to the given domain during a specific time period (e.g., daily or hourly).
- A number of referrers to the given domain.

Examples of how the one or more access time profiles can be used to analyze the information in records 90 include:

- A higher number of distinct dates 98 that a given domain is accessed by workstations 24 indicates a higher suspicion that the given domain is a CnC channel.
- A higher number of distinct hours during a given time period (i.e., based on time 100) that a given domain 94 is accessed by workstations 24 indicates a higher suspicion that the given domain is a (malicious or benign) CnC channel.

Examples of how the one or more domain popularity profiles can be used to analyze the information in records 90 include determining a number of workstations 24 that access a given domain 94 and determining a count of accesses (e.g., connections by workstations 24) to a given domain 94. Typically, most domains 94 are accessed by only a few workstations 24. Therefore processor 70 can assign a lower malicious CnC suspicion to domains 94 that are accessed by higher numbers of workstations.

An example of how the one or more malicious artifact profiles can be used to analyze the information in records 90 comprises determining a number of referrers (e.g., respective distinct numbers of webpages that link to each domain) for each domain 94, and assigning lower malicious CnC suspiciousness (e.g., scores) to the domains having higher numbers of referrers.

Examples of how the one or more malicious domain profiles can be used to analyze the information in records 90 include, but are not limited to, assigning higher malicious domain suspiciousness to domains 90 having longer domain names, having younger domain ages, having hidden registrant information (i.e., these are only a few examples).

In a first model generation step 126, processor 70 uses profiles 110, 112 and 114 to generate CnC model 82. In embodiments of the present invention, model 82 analyzes, using the features in profiles 110, 112, and 114, the data transmissions in the collected data to predict if a given domain 44 hosts a CnC channel.

Finally, in a second model generation step 128, processor 70 uses profile(s) 116 to generate malicious domain model 84. In embodiments of the present invention, model 84 analyzes, using the features in profile(s) 116, the data transmissions in the collected data to predict if a given domain 44 is malicious. Therefore, as described in the description referencing FIG. 5 hereinbelow, processor 70 can use models 82 and 84 to predict if given domain 44 hosts a malicious CnC channel. In some embodiments, processor 70 may use profiles 110, 112, 114 and 116 to create a single malicious CnC model (not shown) that can predict, based on the collected data, if a given domain 44 hosts a malicious CnC channel.

In some embodiments, generating the models may comprise the classification algorithm in classifier application 80 using the respective profiles to analyze the collected data to build models 82 and 84. For example, the analysis may provide weights that CnC model 82 can use to apply to features in the collected information (e.g., the features in Appendix 10 hereinbelow) in order to predict if a given domain 44 is suspected to host a CnC channel.

Figure 4:
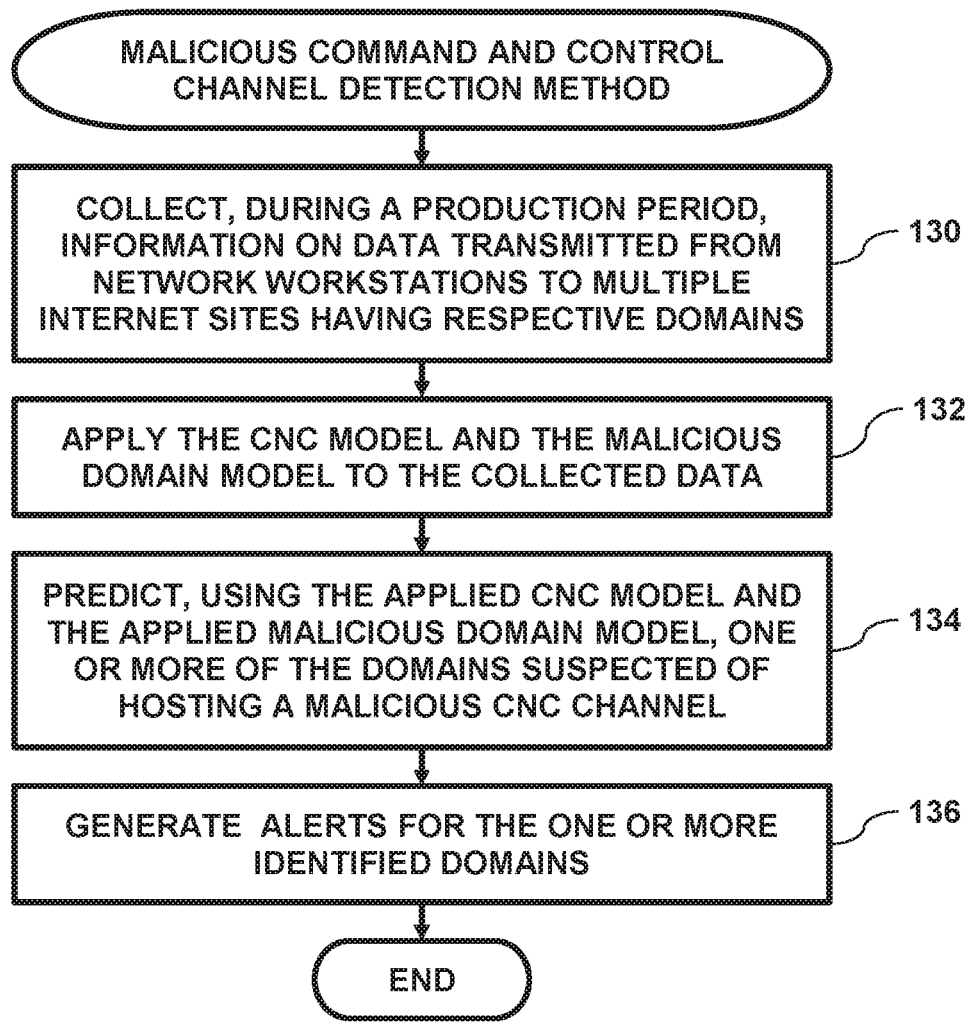
FIG. 4 is a flow diagram that schematically illustrates a method for using the model to identify one or more domains that are suspected of hosting malicious CnC channels, in accordance with an embodiment of the present invention.

FIG. 4 is a flow diagram that schematically illustrates a method for using the models 82 and 84 to identify, during a production period (subsequent to the training period), one or more domains 44 that are suspected of hosting malicious CnC channels, in accordance with an embodiment of the present invention. In a collection step 130, using embodiments described supra, processor 70 collects, during the production period, information on data transmitted from workstations 24 to Internet sites 26, and, in some embodiments, stores the collected information to analysis records 90.

In a model application step 132, processor 70 (e.g., executing classification application 80) applies the CnC model (comprising profiles 110, 112 and 114) and the malicious domain model (comprising profile 116) to the information collected in step 130, and in a prediction step 134, the processor predicts (i.e., determines), suspiciousness (i.e., if any of the domains are hosting malicious CnC channels) based on respective predictions from models 82 and 84. In some embodiments, processor 70 can (a) apply CnC model 82 by modeling, using profiles 110, 112 and 114, the collected data, apply malicious domain model 84 by modeling, using malicious domain profile(s) 116, the collected data, and (c) predict the suspiciousness of a given domain 106 based on the modeled collected information.

Finally, in an alert step 136, processor 70 generates alerts for the one or more identified domains, and the method ends. For example, processor 70 can present the one or more identified domains on monitor 76, or configure gateway 28 (or a network firewall) to restrict access to the identified domains.

As described supra in the description referencing step 128 in FIG. 3, processor 70 can create a single malicious CnC model that can predict if a given domain 44 hosts a malicious CnC channel. In this embodiment, processor 70 can apply the malicious CnC model to the collected data (i.e., step 134) and predict, using the malicious CnC model, if a given domain 44 is suspected of hosting a malicious CnC channel (i.e., step 136)

As described supra, processor 70 performs the prediction by executing model 82 (that uses profiles 110, 112 and 114) and model 84 (that uses profile 116) to predict (e.g., with a confidence level) if any of the domains are hosting malicious CnC channels based on a confidence score. In an alternative embodiment, processor 70 can predict if any of the domains are hosting malicious CnC channels by model 82 computing, based on computations performed by models 82 and 84) a malicious CnC score for each of the domains, and identifying any of the scores are greater than a specified threshold. In the alternative embodiment, model 82 can generate a CnC score, model can generate a maliciousness score), and the processor can compute the malicious CnC score based on the CnC score and the maliciousness score.

In some embodiments domain suspiciousness (or the score) may comprise a CnC suspiciousness (or a CnC score) based on the relationships to the popularity profiles, the access time profiles and malicious artifact profiles, and a malicious suspiciousness (or a maliciousness score) based on the acquired maliciousness information. For example, classification application 80 can use CnC model 82 to compute the CnC suspiciousness (or a CnC score) for each of the domains to identify one or more domains 94 that are suspected to be CnC channels, and can use malicious domain model 84 to compute the malicious suspiciousness (or a maliciousness score) for each of the domains to identify one or more domains 94 that are suspected to be malicious. Models 82 and 84 are described in the Appendices hereinbelow.

In one embodiment, processor 70 can first compute the CnC suspiciousness (or the CnC score) for each domain 94, and identify the domains whose respective CnC suspiciousness (or CnC score) indicates that they are hosting malicious CnC channels. Processor 70 can then the malicious suspiciousness (or a maliciousness score) for each of the identified domains, and generate an alert for each of the domains whose respective malicious suspiciousness (or maliciousness score) indicates that they are a malicious domain 94.

In another embodiment, processor 70 can first compute the malicious suspiciousness (or a maliciousness score) for each domain 94, and identify the domains whose respective malicious suspiciousness (or maliciousness score) indicates that they are a malicious domain 94. Processor 70 can then compute the CnC suspiciousness (or the CnC score) for the identified domains, and generate an alert for each the domains whose respective CnC suspiciousness (or CnC score) indicates that they are hosting malicious CnC channels.

Appendix 1: Access Time and Popularity Profiles

In the following descriptions, processor 70 also refers to processor 70 executing classification application 80. As described supra, processor 70 uses the access time profiles and the popularity profiles to analyze records 90. As the following table shows, a combination between popularity and access time information enables processor 70 to detect domains 94 that behave like malicious CnC channels, characterized by low popularity and high periodicity (which can be used in the access time profiles):

|  | Low popularity (accessed by few endpoints) | High popularity (accessed by many endpoints) |
| --- | --- | --- |
| Low periodicity | 90% Legitimate unknown websites such as fashion-blog.com Malicious infection sites such as download-malware.com Malicious phishing sites. | 2% Legitimate known websites such as stackoverflow.com and my-bank.com |
| High periodicity | 2% Legitimate unknown websites such as Blog-i-really-like.com Malicious APT domains such as PT-CnC-channel.com | 6% Legitimate CnC channels such as Windows-update.com, antivirus-update.com Legitimate "periodic" sites such as facebook.com Unwanted CnC channels such as Ad-toolbar.com and my-botnet-cnc.com |

In addition to using periodicity information, access time profiles 112 can include information about each data transmission from a given workstation 24 to a given domain 44. Examples of information that can be included in access time profiles 112 include, but are not limited to, a duration of a given transmission, a variability of a session length for the given transmission, and an average length of transmissions (e.g., to a given domain 44, or from a given workstation 24 to a given domain 44).

In order to consider periodicity, embodiments of the present invention may aggregate the data collected over (for example) a single month, and only consider the destination (i.e., a given domain 94). This can be significant since an attack might start from a first given workstation 24 and then transfer to a second given workstation 24, while deleting the malware from the first given workstation. In this case, analyzing data traffic from the two given workstations separately will probably not detect a CnC anomaly.

Appendix 2: System Structure Overview

In some embodiments, anomaly detection system 22 may be implemented in a cloud processing environment, which is connected to and collects data from the probes that are deployed in multiple different client networks. For simplicity, assume that all the aggregated data from the probes is transmitted to the cloud.

In a cloud processing environment, the cloud performs the following steps in order to find malicious CnC domains:
Applying a CnC classifier model (e.g., model 82) on the aggregated data coming e.g., from the probes. This classifier detects both malicious and legitimate CnC channels, based on the aggregated traffic from the client's network (e.g., network 30).
The CnC classifier model can also use malicious artifacts to give a higher score to the domains that "seem" malicious.
The suspected domains from the previous step are entered to a "malicious domains classifier," (e.g., model 82) which tries to predict if a given domain 94 is malicious or not.
This classifier does not care whether the domain is used for CnC or not.
The domains entering the "malicious domains classifier" might also be sent for questioning to threat intelligence services.
The "newer" the domain, the less we trust threat intelligence services.

Appendix 3

Malicious Domain Classifier—Calculating Basic Weak Classifiers

When considering domain suspiciousness, frameworks implementing embodiments of the present invention are supervised, having many triplets of the form {domain, features, concept}, where {domain, features} comprise the input to the classification application, and {concept} is the required output used to predict domain suspiciousness.

Sometimes the feature matrix is very sparse and each feature appears positively rarely. In these cases, many algorithms that try to model the concept (e.g., decision trees) are likely to fail. Systems implementing embodiments of the present invention cope with the problems by building weak classifiers upon the features. A possible weak classifier is to condition the concept in the feature.

System implementing embodiments of the present invention can use the following two stages:
In a first stage, for every feature i with n possible values $\{v_{i,1}, \ldots, v_{i,n}\}$ processor 70 calculates a probability for being malicious for each value $\{p_{i,1}, \ldots, p_{i,n}\}$, where, for example $$p_{i,j} = P(\text{malicious}| F_i = v_{i,j}) = \frac{\text{number of malicious domains with } v_{i,j}}{\text{total number of domain with } v_{i,j}} \quad (1)$$

For example, the following table includes values that can be used when considering lengths of domains 94:

| IPs | Malicious Domains | Total Domains | $p_{i,j}$ |
| --- | --- | --- | --- |
| 3 | 10 | 1,000 | 0.010 |
| 4 | 15 | 1,000 | 0.015 |
| 5 | 30 | 600 | 0.200 |

In a second stage, Equations (1) (in embodiments herein Equations are also referred to as scores) are computed for each of the features, processor 70 can combine all these scores in order to receive a verdict for a given domain. One possible embodiment for computing the final score is to combine the probabilities (scores) assuming that they are independent:

$$\text{Full Domain Suspiciousness Score} = 1 - \Pi_i(1-p_i) \quad (2)$$

In embodiments described herein this may also be referred to as a Full Score. In some embodiments, a Partial Domain Suspiciousness Score may be computed by using Equation (2) will fewer features.

Next, a threshold for the Final Score can be decided, were domains that have a Final Score greater than a threshold will be considered as malicious. The algorithm proposed herein can applicable for many scenarios, but some scenarios may require additional adjustments. For examples, two extensions to the algorithm may comprise:
Feature values with numerous samples.
Handling noisy data.
Other possible implementations might be using Naive Bayes algorithm, different schemes of distribution estimations and different methods for aggregating probabilities.

Appendix 4: Estimating Probabilities with Few Samples

The example and the proposed method presented supra in Appendix 3 might be problematic in cases where the number of samples is low in some regions. For example, consider the same table with two additional rows (i.e., the bottom two rows):

| Number of IPs | Number of Malicious Domains | Total Number of Domains | $p_{i,j}$ |
| --- | --- | --- | --- |
| 3 | 10 | 1,000 | 0.010 |
| 4 | 15 | 1,000 | 0.015 |
| 5 | 30 | 600 | 0.200 |
| 6 | 0 | 500 | 0.000 |
| 7 | 0 | 4 | 0.000 |

Both of the new rows have zero malicious domains, and thus have a naive probability of zero, but clearly they should be treated differently. While it is likely that for name_length=6, the actual (i.e. when also considering all the examples we haven't seen yet) probability of being malicious is probably pretty low, for domains 94 with name_length=7, it is difficult to estimate the probability because of the low number of total samples.

The inventors discovered this problem when analyzing domain suffixes, and identified the proposed solution that can also relate to any problem with similar attributes.

The following describes a method for estimating probabilities of sub-groups within groups of elements, when some of the groups have a low number of elements to begin with. This method can be used by embodiments of the present invention to estimate a probability that a given domain 94 with a specific suffix (e.g., ".com", "org") is malicious, but it can similarly be applied to many other problems that have similar characteristics.

The following is an example of an analysis used a sample set of 300 k domains accessed by all the inventor's clients during a given period of time. In the sample set, each of the domains has two properties:

A label (benign or malicious).
A 'domain suffix'—i.e., the top-level-domain of the domain.

The following table was derived from the dataset:

| domain_suffix | Number of Domains | Number of "bad" Domains | Bad Domain Ratio |
|---|---|---|---|
| com | 269,839 | 2,876 | 0.01066 |
| net | 31,563 | 371 | 0.01175 |
| org | 20,469 | 117 | 0.00572 |
| il | 16,376 | 77 | 0.00470 |
| ru | 10,557 | 143 | 0.01355 |
| uk | 6,490 | 29 | 0.00447 |
| me | 4,108 | 8 | 0.00195 |
| edu | 4,084 | 0 | 0.00000 |
| gov | 1,819 | 0 | 0.00000 |
| co | 1,811 | 13 | 0.00718 |
| pl | 1,543 | 31 | 0.02009 |
| biz | 890 | 22 | 0.02471 |
| su | 153 | 3 | 0.01961 |
| ps | 46 | 1 | 0.02174 |
| cr | 46 | 0 | 0.00000 |

In this table:

Different domain suffixes may have significantly different probabilities of being malicious. Specifically ".org" has probability of 0.00572 while ".biz" has probability of 0.02471.

There are several suffixes that all have zero bad domains found. One question that may need be addressed is if these should be treated the same way?

'.edu' has zero bad domains out of 4,048 while '.cr' has zero bad domains out of 47. For practical reasons, it is clear that '.cr' cannot be assigned a score of zero.

Embodiments of the present invention handle the above problem (i.e., a small number of relevant samples)) by assessing a probability that a given domain is malicious based on its suffix, and use that score for that domain. In some embodiments, the following function can be used:

$$f(n_i, p_i, N, P) \rightarrow [0 \ldots 1] \quad (3)$$

where $n_i$ is a total number of the domains for domain suffix
$m_i$ is a total number of malicious domains for domain suffix "i".
$p_i = m_i/n_i$ indicating an empiric probability for a given domain having a domain suffix "i" to be malicious.
$\Sigma_i n_i$ indicates a total number of domains.
$P = \Sigma_i m_i / \Sigma_i n_i$ indicates a probability for a given domain to be malicious without relating to its suffix.

Typically, function f behaves differently for small and large $n_i$:

If $n_i$ is "small", f should provide a result close to P, since a small number of the samples have low predictability.
If $n_i$ is "big", f should provide a result close to $m_i/n_i$.

For example, assuming the following:
Two samples [$n_1$=5, $p_1$=0], [$n_2$=500, $p_2$=0]
N=1,000
P=0.01
We would like to receive $f(n_1, p_1, N, P) \approx P$ and $f(n_2, p_2, N, P) \approx p_2$.
However, if N was $10^8$, then $f(n_2, p_2, N, P)$ should be close to P, not $p_2$.

The following approaches can be used to compute f:

Laplace smoothing that can estimate event's probability based on its past occurrences. Embodiments of the present invention can use this approach to adjust the naïve prediction.

Bayesian update rules also apply to a single event, using a sample from a natural distribution. Embodiments of the present invention can use this approach by partitioning the natural distribution into multiple groups, and it can be determined if each of the groups has its own distribution or if the distribution is randomly selected from the natural distribution of the entire database.

In one embodiment, f can be computed as follows:
Calculate $l = g(n_i, p_i, N, P)$, which indicates a likelihood to sample $(n_1, p_i)$ samples from the dataset.
Let $$p_{general} = \frac{P}{N}$$

$$g(n_i, p_i, N, P) = \binom{n_i}{p_i}(p_{general})^i (1 - p_{general})^{n_i - p_i}$$

The more samples there are, the lower the probability that they were randomly chosen.
Malicious samples affect the probability differently than benign samples affect the probability, which is a desired behavior.

Then, $f(n_i, p_i, N, P)$ would be $f(n_i, p_i, N, P)*l*P+(1-l)*p_i$.

Appendix 5: Handling Noisy Data

In most features, it can be expected that the change in $p_i$ values would be rather smooth and consistent. However, in some cases, the data we rely on when calculating $p_i$ values may be noisy.

Figure 5:
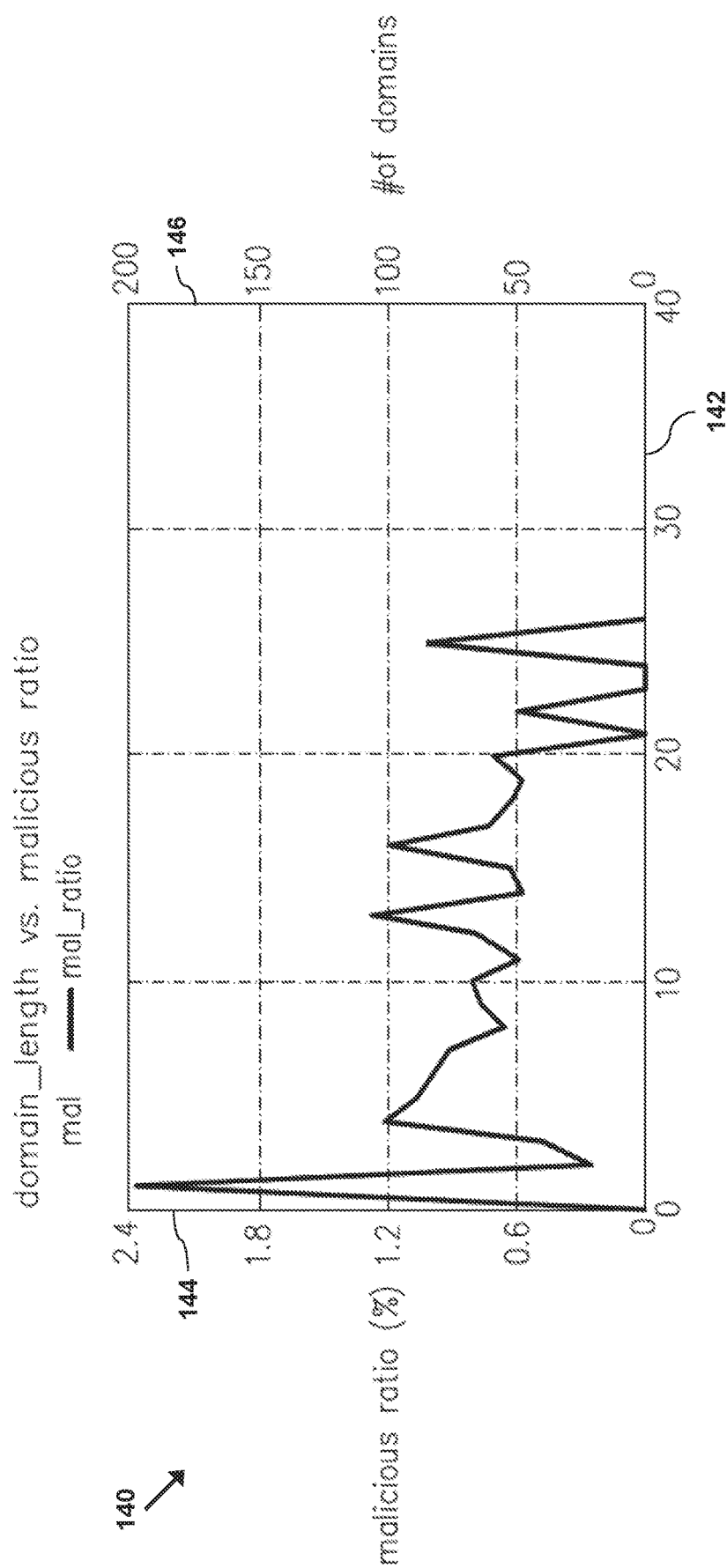
FIG. 5 is a chart that plots domain lengths vs. respective malicious ratios, in accordance with an embodiment of the present invention.

FIG. 5 is a chart 140 that plots domain lengths 142 (i.e., number of characters in a domain) vs. respective malicious ratios 144 (i.e., a number of malicious domains 146/a number of domains 146 having a given length 142), in accordance with an embodiment of the present invention. As shown in chart 140, the domain length does relate to its suspiciousness (i.e., a probability of being malicious), but the changes in the graph are much too rapid to represent to "real world" data.

Figure 6:
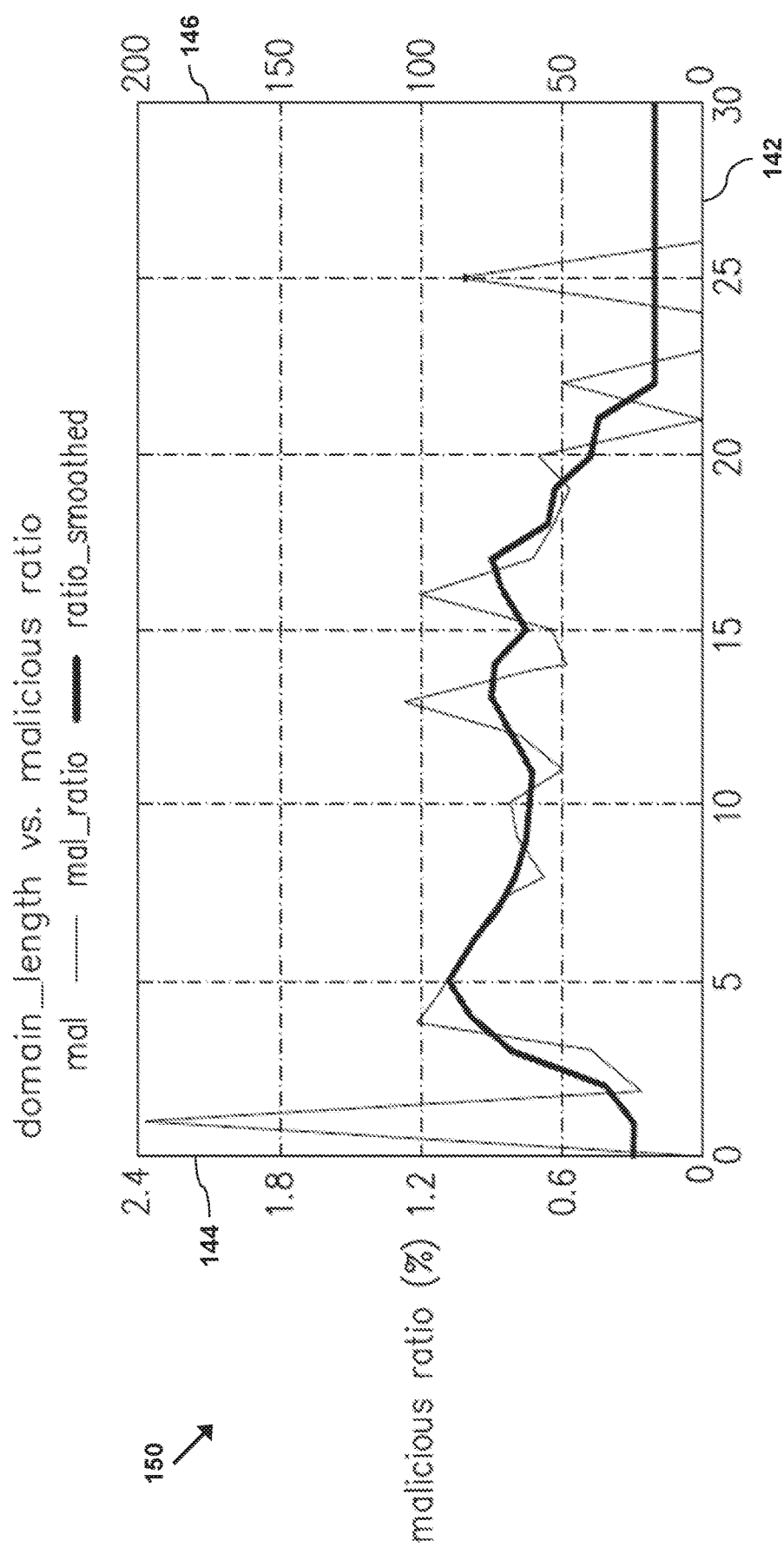
FIG. 6 is a chart that plots domain lengths vs. "smoothed" respective malicious ratios, in accordance with an embodiment of the present invention.

FIG. 6 is a chart 150 that shows a smoothing algorithm applied to (i.e., the data used to generate) chart 150, in accordance with an embodiment of the present invention. The smoothing algorithm is described hereinbelow, and chart 150 shows that the probability of being malicious is pretty low for very short and very long domains, and the probability is higher for in the middle range (i.e., of the domain lengths).

The following is an example of a smoothing algorithm that can be used in embodiments of the present invention:

1. smoothed_ratio[1] = smoothed_ratio[2]
2. $\forall i, 2 <= i <= I_{thresh}$ :

$$\text{smoothed\_ratio}[i] = \frac{S_{i-1} \cdot r_{i-1} + S_i \cdot r_i + S_{i+1} \cdot r_{i+1}}{S_{i-1} + S_i + S_{i+1}}$$

where:
    $S_i$ - total number of samples for value i,
    $r_i$ - ratio of malicious samples for value i, and
    $I_{thresh}$ - a chosen value which above it the number of samples and malicious ratio is very low.
3. $\forall i, i > I_{thresh}$ : smoothed_ratio[i] = CONST
    where CONST can be chosen by a system administrator or a cyber-security expert.

Appendix 6: Calculating a CnC Classifier Score

When considering domain CnC score, the inventors did not use the same method as the domain suspiciousness score since there was not enough labeled data. One reason for this is while CnC channels are numerous, malicious ones are even more infrequent.

The following algorithm combines a statistical approach together with "domain knowledge" from experts consulted by the inventors:

For each feature with possible values {1, . . . , n} there exist the number of domains that agree to that value.

The feature values are split into K bins, aiming to have as similar as possible domains in each bin.

The probability of each bin is the calculated.

The following table shows an example for the feature "distinct days":

| number of distinct days | number of domains | bin | probability |
|---|---|---|---|
| 1 | 10,000 | 1 | 0.704 |
| 2 | 1500 | 2 | 0.105 |
| 3 | 1400 | 3 | 0.098 |
| 4 | 600 | 4 | 0.093 |
| 5 | 400 | | |
| 6 | 300 | | |

The inventors consulted their domain experts and decided together on a "direction" of the feature. For "distinct days" the direction might be "UP", meaning more distinct days where the domain was seen indicates a higher suspicion. The probability is then accumulated in the chosen "direction" to receive the score function of the feature, as shown in the following table:

| number of distinct days | number of domains | bin | probability | SCORE accumulative probability (direction = UP) |
|---|---|---|---|---|
| 1 | 10,000 | 1 | 0.704 | 0.704 |
| 2 | 1,500 | 2 | 0.105 | 0.809 |
| 3 | 1,400 | 3 | 0.098 | 0.907 |
| 4 | 600 | 4 | 0.093 | 1 |
| 5 | 400 | | | |
| 6 | 300 | | | |

In this example (i.e., in the tables), a domain with one distinct day will receive the score 0.704, and a domain with three distinct days will receive the score 0.907.

The CnC Score for each domain is computed by multiplying the scores of the features:

$$\text{CnC Score} = \Pi_i \text{ score}_i \quad (4)$$

Appendix 7

Combining Domain Suspiciousness Score and Domain CnC Score

The final verdict of the domain is determined by a combination of the domain suspiciousness score and the domain CnC score. In some embodiments, a possible function would be:

$$\text{Final Score} = \text{CnC Score} * \text{Full Domain Suspiciousness Score} \quad (5)$$

Alerts may be presented to a user according to the final score. For example, a "high risk" alert may be presented for domains with a high score and "medium risk" alert maybe presented for lower final score values. Additionally, for each alert, minimal values for the CnC Score and the Domain Suspiciousness Score may be specified.

For example, a "high risk" alert may require:
Final Score >0.8
CnC Score >0.6
Domain Suspiciousness Score >0.9

Appendix 7: Detailed Workflow

Figure 7:
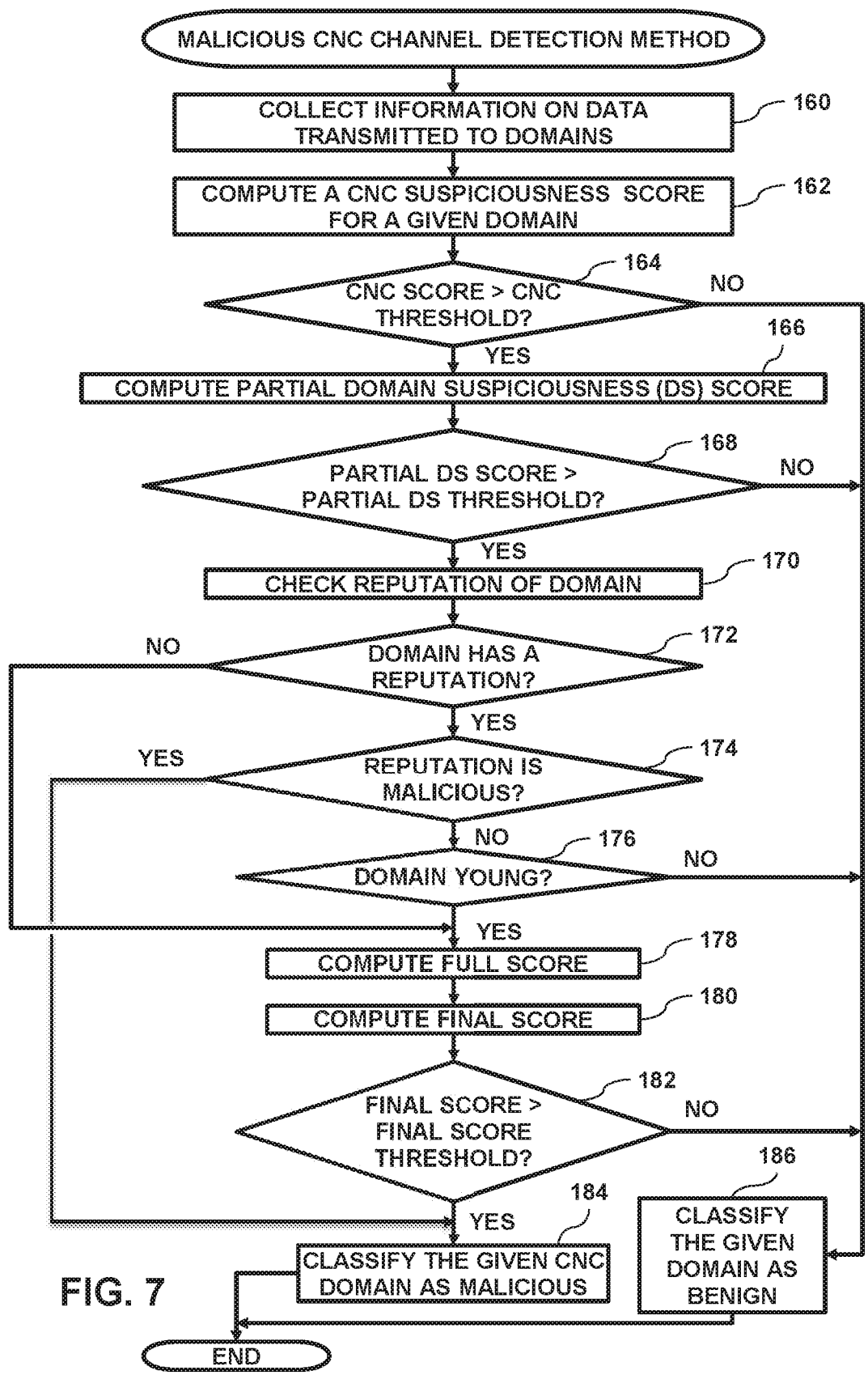
FIG. 7 is a flow diagram that schematically illustrates a method for identifying one or more domains that are suspected of hosting malicious CnC channels, in accordance with a second embodiment of the present invention.

FIG. 7 is a flow diagram that schematically illustrates a method for using the formulas described supra for detecting suspicious CnC channels in domains 94, in accordance with an embodiment of the present invention. Using embodiments described supra, processor 70 collects data on transmissions from workstations 24 to Internet sites 26 in a collection step 160, and computes a CnC Suspiciousness Score (Equation 4) for a given domain 94 in a first computation step 162.

In a first comparison step 164, if the computed CnC Suspiciousness Score is greater than a CnC suspiciousness score threshold, then in a second computation step 166, processor 70 computes a Partial Domain Suspiciousness Score (Equation 2). In a second comparison step 168, is the computed Partial Domain Suspiciousness Score is greater than a Partial Domain Suspiciousness Score threshold, then in a check step 170, processor 70 checks the reputation of the given domain (e.g., using acquired data 88, as described supra).

In a third comparison step 172, if the given domain has a reputation, then in a fourth comparison step 174, processor 70 checks if the given domain's reputation is malicious. If the given domain's reputation is not malicious, then in a fifth comparison step 176, processor 70 checks if the domain is young. For example, the given domain may be considered young if its age (i.e., since registration) is less than three months.

If the given domain is young, then processor 70 computes a Full Score (Equation 2) for the given domain in a third computation step 178, and computes a Final Score (Equation 5) for the given domain in a fourth computation step 180. In a sixth comparison step 182, if the computed Final Score is greater than a final score threshold, then processor 70 classifies the given domain as a malicious CnC channel in a first classification step 184, and the method ends.

Returning to step 182, if the computed Final Score is less than or equal to the final score threshold, then in a second classification step 186, processor 70 classifies the given domain as benign and the method ends. Returning to step 174, if the given domain does not have a malicious reputation, then the method continues with step 186. Returning to step 172, if the given domain does not have a reputation, then the method continues with step 178. Returning to step 168, if the Partial Domain Suspiciousness Score is less than or equal to the partial domain suspiciousness score threshold, then the method continues with step 186. Returning to step 164, if the CnC Suspiciousness Score is less than or equal to the Domain suspiciousness score, then the method continues with step 186.

Appendix 8: Autonomous System (Asn) Classifier

An ASN is a company that has ownership of a specific IP address range. As described in U.S. Patent Application titled "Identifying Internet Sites Belonging to Bulletproof Autonomous Systems" cited above, two attributes of an ASN are rentable and bulletproof.

An ASN is rentable if they can be paid in order to host a website on their servers. Many ASNs are not rentable. For example, a bank typically has many private servers that are connected to the internet (thus have an external IPs) but are for internal use and cannot be rented. On the other hand web site hosting companies typically have servers and specific IP ranges that can be rented to host a website.

Bulletproof ASNs are "friendly" for malicious activity in that they allow hosting almost everything on their servers and promise not to take it down and not to cooperate with law enforcement authorities. Therefore, they are usually much more expensive than non-bulletproof ASNs.

When analyzing ASNs for embodiments of the present invention, the following factors are considered:

Non-rentable ASNs usually do not host malicious domains.
  Non-rentable ASNs are also not bulletproof, since they do not host external services (i.e., malicious or benign).
  Domains hosted on Bulletproof ASNs are from a "bad neighborhood" and are more suspicious.

Some embodiments of the present invention use co-training in order to learn properties of ASNs. Co-training techniques that can be used for this purpose are described in U.S. Patent Application, filed on even date, titled "Identifying Bulletproof Autonomous Systems" cited above.

Appendix 9: Network-to-Process Anomaly Detection System

In addition to identifying which domains 44 were accessed from network 30 and from a given workstation 24, probe 78 can also identify which process 40 initiated the access request. This sort of capability is described, for example, in PCT Patent Application PCT/IB2014/058299, filed Jan. 15, 2014, whose disclosure is incorporated herein by reference.

For each given workstation 24 in network 30, the following data is available:
  What processes 40 are currently running.
  For each given process 40, what are the loaded DLLs (+MD5 hash function on each file).
  A time series of domain access.

Using this data, processor 70 can be configured to identify a malicious process 40 (or a malicious DLL in the attacked malicious process). When analyzing this information, processor 70 can look for the following:

Find uncommon processes 40 that frequently access uncommon domains 44.

For popular processes 40:
  Find a common list of domains 44 that they access.
  Find anomalous domains 44.

Appendix 10: Example Feature List

The following table lists features that can be used classifier models 82 and 84 for scoring domains 106 for purposes of classification:

| Detector | Type/Profile | Feature Name | Comments |
| --- | --- | --- | --- |
| 1. CnC | Periodicity/ Access Time | Distinct weekdays | High - high score Low - low score number of distinct weekdays within a specific (e.g., 30 day) time period that the domain was accessed |
| 2. CnC | Periodicity/ Access Time | Distinct weekend days | Number of distinct weekend days within a specific (e.g., 30 day) time period that the domain was accessed |
| 3. CnC | Periodicity/ Access Time | Distinct hours | Number of distinct hours within a specific (e.g., 30 day) time period that the domain was accessed |
| 4. CnC | Popularity | Distinct computers | Number of distinct computers within a specific (e.g., 30 day) time period that the domain was accessed from |
| 5. CnC | Malicious Artifacts | Number of connections | Total number of connections to the domain within a specific (e.g., 30 day) time period |
| 6. CnC | Malicious Artifacts | Average volume | Average volume of all of the connections to the domain within a 30 day period |
| 7. CnC | Malicious Artifacts | Variance of Volume | Variance volume of all of the connections to the domain within a 30 day period |
| 8. CnC | Malicious Artifacts | Number of Referrers | High - low score Low - high score total number of referrers to the domain within a 30 day period |
| 9. Domain Suspiciousness | Partial Score | Domain Length | Number of letters in the domain |
| 10 Domain Suspiciousness | Partial Score | Top Level Domain (TLD) | The TLD |
| 11 Domain Suspiciousness | Partial Score | Number of IPs | Number of distinct IP addresses the domain was resolved to within a 30 day period |

-continued

| Detector | Type/Profile | Feature Name | Comments |
|---|---|---|---|
| 12 Domain Suspiciousness | Partial Score | #ASNs | Number of distinct ASNs the domain was hosted on resolved to within a 30 day period |
| 13 Domain Suspiciousness | Partial Score | ASN is Rentable | Were the ASNs the domain hosted on rentable ASN? |
| 14 Domain Suspiciousness | Partial Score | ASN is Bulletproof | were the ASNs the domain was hosted on bulletproof ASNs? |
| 15 Domain Suspiciousness | Full score | Domain age | Domain age according to the WHOIS record |
| 16 Domain Suspiciousness | Full Score | Registrant name is hidden (blacklist of common hidden names) | Des the registrant name appear in a blacklist of names? |
| 17 Domain Suspiciousness | Full Score | Registrant org is hidden (blacklist of common hidden names) | Does the registrant organization appear in a blacklist of names? |
| 18 Domain Suspiciousness | Full Score | Registrant name is hidden (using keywords, like "private") | Does the registrant name contain specific suspicious keywords? |
| 19 Domain suspiciousness | Full Score | Registrant org is hidden (using keywords, like "private") | Does the registrant organization contain specific suspicious keywords? |

Appendix 11: Summarizing Example

For example, consider the following malicious domain sales[.]support[.]xyz that was used for the DustySky APT operation. The computed dataset for this domain may be the following:

| Usage Feature (CnC Detector) | Value | Score |
|---|---|---|
| Distinct weekdays | 18 | 0.88 |
| Distinct weekend days | 6 | 0.92 |
| Distinct hours | 20 | 0.95 |
| Distinct computers | 5 | 0.9 |

Processor 70 computes a CnC Score (Equation 4) for this domain as $$\text{CnC Score} = 0.88 * 0.92 * 0.95 * 0.9 = 0.69$$

If the specified CnC Score threshold is 0.3, then this domain would pass the CnC classifier (i.e., application 80 using model 82) and enter the malicious domains classifier (i.e., application 80 using model 84).

The malicious domains classifier retrieves the following information from a WHOIS record:
Domain: SUPPOIT.XYZ
Creation Date: 2015 Oct. 7T12:26:140Z
Registrant Name: WhoisGuard Protected
Registrant Organization: WhoisGuard, Inc.
and extracts the following features:

| Usage Feature (CnC detector) | Value | Score |
|---|---|---|
| Domain length | 6 | 0.018 |
| Top level Domain | .xyz | 0.2 |
| #IPs | 20 | 0.09 |
| #ASNs | 1 | 0.015 |
| ASN is rentable | True | 0.02 |
| ASN is bulletproof | True | 0.25 |
| Domain age | 10 months | 0.1 |
| Registrant name is hidden. (blacklist of common hidden names) | True Registrant Name: WhoisGuard Protected Registrant Organization: WhoisGuard, Inc. | 0.3 |
| Registrant org is hidden(blacklist of common hidden names) | Registrant Name: WhoisGuard Protected Registrant Organization: WhoisGuard, Inc. | 0.35 |
| Registrant name is hidden (using keywords, like "private") | Registrant Name: WhoisGuard Protected Registrant Organization: WhoisGuard, Inc. | 0.28 |
| Registrant org is hidden (using keywords, like "private") | Registrant Name: WhoisGuard Protected Registrant Organization: WhoisGuard, Inc. | 0.2 |

Processor 70 can then calculate the Final Score (Equation 5) as:

$$\text{Final Score} = 1 - (1-0.018) \cdot (1-0.2) \cdot (1-0.09) \cdot (1-0.015) \cdot (1-0.02) \cdot (1-0.25) \cdot (1-0.1) \cdot (1-0.3) \cdot (1-0.35) \cdot (1-0.28) \cdot (1-0.2) = 0.8779204763$$

Now, assume the following thresholds for marking domain as a malicious CnC channel:
final score threshold >0.7 (Computed: 0.8779204763)
CnC score threshold >0.5 (Computed: 0.69)
final score*CnC score threshold>0.6 (ours: 0.605)
Since this example meets to these 3 conditions, the domain sales[.]suppoit[.]xyz can be marked as a malicious CnC domain.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. A method for detecting malicious command and control (CNC) channels, comprising:
  collecting, by a processor, information on data transmitted at respective times between multiple endpoints and multiple Internet sites having respective domains;
  acquiring, from one or more external or internal sources, malicious domain information and malicious Internet Protocol (IP) hosting information for the domains;

generating an access time profile based on the times of the transmissions to the domains;

generating a popularity profile based on the transmissions to the domains;

generating a malicious domain profile based on the acquired malicious domain information and the acquired malicious Internet Protocol (IP) hosting information;

modeling, using the access time profile, the popularity profile and the malicious domain profile, the collected information;

predicting one or more of the domains to host a malicious CNC channel based on their respective modeled collected information; and generating an alert for the one or more predicted domains;

wherein predicting a given domain to be suspicious comprises calculating a score responsive to the modeled collected information for the given domain and the malicious domain information for the given domain, and detecting that the score is greater than a specified score threshold, wherein modeling the collected information comprises modeling using a malicious artifact profile, and wherein the malicious domain information comprises domain registration features or domain name features.

2. The method according to claim 1, wherein collecting the information comprises retrieving data packets from the network.

3. The method according to claim 1, wherein collecting the information comprises retrieving the information from log data.

4. The method according to claim 1, wherein the malicious artifact profile comprises one or more features selected from a group consisting of a domain reputation, a total number of connections to a given domain during a specific time period, an average volume of the connections to the given domain during a specific time period, a variance of the volume to the given domain during a specific time period, and a number of referrers to the given domain.

5. The method according to claim 1, wherein predicting a given domain to be suspicious comprises predicting, for the given domain, a command and control (CnC) suspiciousness based on the modeled collected information and a malicious suspiciousness based on the malicious domain information.

6. The method according to claim 5, wherein predicting the CnC suspiciousness comprises executing a classification algorithm using a CnC suspiciousness model, and wherein predicting the malicious suspiciousness comprises executing the classification algorithm using a malicious domain model.

7. The method according to claim 5, wherein predicting the one or more domains to be suspicious comprises predicting a plurality of domains to be CnC channels based on their respective CnC suspiciousness, and predicting, from the plurality of domains predicted to be CnC channels, the one or more domains based on their respective malicious suspiciousness.

8. The method according to claim 5, wherein predicting the one or more domains to be suspicious comprises predicting a plurality of domains to be malicious based on their respective malicious suspiciousness, and predicting, from the plurality of domains predicted malicious, the one or more domains based on their respective CnC suspiciousness.

9. The method according to claim 1, wherein the malicious domain information comprises domain registration features and domain name features.

10. The method according to claim 9, wherein the domain has a registrant, and wherein each of the domain registration features is selected from a list consisting of whether or not the registrant appears on a blacklist and whether or not the registrant comprises any suspicious keywords.

11. The method according to claim 9, wherein each of the domain name features is selected from a list consisting of a length of the domain, whether or not the domain is a top level domain and an age of the domain.

12. The method according to claim 1, wherein the malicious IP hosting information is selected from a list consisting of, domain to IP information for the domain, a number of distinct IP addresses resolved to the domain during a specified time period, a number of distinct autonomous systems that hosted the domain during a specified time period, whether or not the domain is hosted on a rentable autonomous system, whether or not the domain is hosted on a bulletproof autonomous system.

13. The method according to claim 1, wherein generating an access profile based on the times of the transmissions to the domains comprises determining a number of distinct time periods of the transmissions to the domains during a specified time period, wherein a level of suspiciousness of a given domain is directly correlated to the number of distinct time periods of the transmissions to the given domain.

14. The method according to claim 13, wherein the distinct time periods are selected from a list consisting of distinct dates, distinct hours during a specific time period, distinct weekend days during a specific time period, and a number of distinct hours.

15. The method according to claim 1, wherein the access time profiles are also based on respective durations of the transmissions to each of the domains.

16. The method according to claim 1, wherein the access time profiles are also based on respective variabilities of session lengths of the transmissions to each of the domain.

17. The method according to claim 1, wherein the access time profiles are also based respective average lengths of the transmissions to each of the domains.

18. The method according to claim 1, wherein generating the popularity profile comprises identifying a total number of connections to each given domain in the transmissions to the domains.

19. The method according to claim 1, wherein generating the popularity profile comprises identifying a number of distinct endpoints accessing a given domain during a specific time period.

20. The method according to claim 1, wherein a plurality of the endpoints comprise respective additional processors executing multiple software processes transmitting to the domains, and comprising identifying a first given software process as unpopular, identifying a second given software process as popular, identifying a first given domain as unpopular, and identifying a second given domain as anomalous, and wherein predicting one or more of the domains to be suspicious comprises identifying the first given software process transmitting to the first given domain or identifying the second given software process transmitting to the second given domain.

21. An apparatus for detecting malicious command and control (CNC) channels, comprising:
a memory; and
a processor configured:
to collect information on data transmitted at respective times between multiple endpoints and multiple Internet sites having respective domains, to acquire, from one or more external or internal sources, malicious domain information and malicious Internet Protocol (IP) hosting information for the domains, to generate an access time profile based on of the transmissions to the domains, to generate a popularity profile based on the transmissions to the domains, to generate a malicious domain profile based on the acquired malicious domain information and the acquired malicious Internet Protocol (IP) hosting information, to model, using the access time profile, the popularity profile and the malicious domain profile, the collected information, to predict one or more of the domains to host a malicious CNC channel based on their respective modeled collected information, and to generate an alert for the one or more-predicted domains;

wherein the processor is configured to predict a given domain to be suspicious by calculating a score responsive to the modeled collected information for the given domain and the malicious domain information for the given domain, and detecting that the score is greater than a specified score threshold, wherein the processor is configured to model the collected information using a malicious artifact profile, and wherein the malicious domain information comprises domain registration features or domain name features.

22. The apparatus according to claim 21, wherein the processor is configured to collect the information by retrieving data packets from the network.

23. The apparatus according to claim 21, wherein the processor is configured to collect the information by retrieving the information from log data.

24. The apparatus according to claim 21, wherein the malicious artifact profile comprises one or more features selected from a group consisting of a domain reputation, a total number of connections to a given domain during a specific time period, an average volume of the connections to the given domain during a specific time period, a variance of the volume to the given domain during a specific time period, and a number of referrers to the given domain.

25. The apparatus according to claim 21, wherein the processor is configured to predict a given domain to be suspicious by predicting, for the given domain, a command and control (CnC) suspiciousness based on the modeled collected information and a malicious suspiciousness based on the malicious domain information.

26. The apparatus according to claim 25, wherein the processor is configured to predict the CnC suspiciousness by executing a classification algorithm using a CnC suspiciousness model, and wherein the processor is configured to predict the malicious suspiciousness by executing the classification algorithm using a malicious domain model.

27. The apparatus according to claim 25, wherein the processor is configured to predict the one or more domains to be suspicious by predicting a plurality of domains to be CnC channels based on their respective CnC suspiciousness, and predicting, from the plurality of domains predicted to be CnC channels, the one or more domains based on their respective malicious suspiciousness.

28. The apparatus according to claim 25, wherein the processor is configured to predict the one or more domains to be suspicious by predicting a plurality of domains to be malicious based on their respective malicious suspiciousness, and predicting, from the plurality of domains predicted malicious, the one or more domains based on their respective CnC suspiciousness.

29. The apparatus according to claim 21, wherein the access time profile comprises one or more features selected from a group consisting of a number of distinct dates that a given endpoint accesses by a given domain, a number of distinct hours during a specific time period that that a given endpoint accesses by a given domain, a duration of a given transmission to a given domain, a variability of a session length for a given transmission to a given domain, an average volume of transmissions to a given domain, a number of distinct weekdays a given domain is accessed during a specific time period, a number of distinct weekend days a given domain is accessed during a specific time period, and a number of distinct hours a given domain is accessed during a specific time period, and wherein the popularity profile comprises one or more features selected from a group consisting of a number of distinct endpoints accessing a given domain during a specific time period, and a total number of connections to a given domain during a specific time period.

30. The apparatus according to claim 21, wherein the processor comprises a first processor, wherein a plurality of the endpoints comprise respective additional processors executing multiple software processes transmitting to the domains, and wherein the identifying a first given software process as unpopular, identifying a second given software process as popular, identifying a first given domain as unpopular, and identifying a second given domain as anomalous, and wherein the first processor is configured to predict one or more of the domains to be suspicious by identifying the first given software process transmitting to the first given domain or identifying the second given software process transmitting to the second given domain.

31. A computer software product for detecting malicious command and control (CNC) channels, the product comprising a non-transitory computer-readable medium, in which program instructions are stored, which instructions, when read by a computer, cause the computer:

to collect information on data transmitted at respective times between multiple endpoints and multiple Internet sites having respective domains;

to acquire, from one or more external or internal sources, malicious domain registration information and malicious Internet Protocol (IP) hosting information for the domains;

to generate an access time profile based on the times of the transmissions to the domains;

to generate a popularity profile based on the transmissions to the domains;

to generate a malicious domain profile based on the acquired malicious domain registration information and the acquired malicious Internet Protocol (IP) hosting information;

to model, using the access time profile, the popularity profile and the malicious domain profile, the collected information;

to predict one or more of the domains to host a malicious CNC channel based on their respective modeled collected information; and to generate an alert for the one or more predicted domains;

wherein the computer is caused to predict a given domain to be suspicious by calculating a score responsive to the modeled collected information for the given domain and the malicious domain information for the given domain, and detecting that the score is greater than a specified score threshold, wherein the computer is caused to model the collected information using a malicious artifact profile, and wherein the malicious domain information comprises domain registration features or domain name features.

32. A method, comprising:

collecting, by a processor, information on data transmitted at respective times between multiple endpoints and multiple Internet sites having respective domains;

acquiring, from one or more external or internal sources, maliciousness information for the domains;

generating an access time profile based on a number of distinct time periods of the transmissions to the domains during a specified time period, wherein a level of suspiciousness of a given domain is directly correlated to the number of distinct time periods of the transmissions to the given domain;

generating a popularity profile based on the transmissions to the domains;

generating a malicious domain profile based on the acquired maliciousness information;

modeling, using the access time profile, the popularity profile and the malicious domain profile, the collected information;

predicting one or more of the domains to be suspicious based on their respective modeled collected information; and generating an alert for the one or more predicted domains;

wherein predicting a given domain to be suspicious comprises calculating a score responsive to the modeled collected information for the given domain and the maliciousness information for the given domain, and detecting that the score is greater than a specified score threshold, wherein modeling the collected information comprises modeling using a malicious artifact profile, and wherein the maliciousness information comprises domain registration features or domain name features.

33. The method according to claim 32, wherein the distinct time periods are selected from a list consisting of distinct dates, distinct hours during a specific time period and distinct weekend days during a specific time period, and a number of distinct hours.

* * * * *